United States Patent
Taori et al.

(10) Patent No.: US 8,381,056 B2
(45) Date of Patent: Feb. 19, 2013

(54) APPARATUS AND METHOD FOR HANDLING DATA ERROR IN DATA TRANSMISSION SYSTEM INCLUDING RELAY STATION

(75) Inventors: Rakesh Taori, Suwon-si (KR); Young Bin Chang, Anyang-si (KR); Mi-Sun Do, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1083 days.

(21) Appl. No.: 12/024,290

(22) Filed: Feb. 1, 2008

(65) Prior Publication Data

US 2008/0250293 A1  Oct. 9, 2008

Related U.S. Application Data

(60) Provisional application No. 60/909,782, filed on Apr. 3, 2007.

(30) Foreign Application Priority Data

Sep. 20, 2007  (KR) .................. 10-2007-0096151

(51) Int. Cl.
*H04L 25/02* (2006.01)

(52) U.S. Cl. .......................... 714/748; 455/7

(58) Field of Classification Search .................. 714/748, 714/774; 455/7
See application file for complete search history.

(56) References Cited

U.S. PATENT DOCUMENTS

| | | | | |
|---|---|---|---|---|
| 6,728,918 | B1 * | 4/2004 | Ikeda et al. | 714/748 |
| 6,975,641 | B1 * | 12/2005 | Kurobe et al. | 370/445 |
| 7,152,196 | B2 | 12/2006 | Wu et al. | |
| 7,373,103 | B2 * | 5/2008 | Sato et al. | 455/7 |
| 7,577,124 | B2 * | 8/2009 | Yomo et al. | 370/338 |
| 7,787,524 | B2 * | 8/2010 | Miyoshi et al. | 375/214 |
| 7,844,883 | B2 * | 11/2010 | Ono | 714/776 |
| 7,882,419 | B2 * | 2/2011 | Takakuwa | 714/761 |
| 7,890,049 | B2 * | 2/2011 | Chang et al. | 455/11.1 |
| 7,929,988 | B2 * | 4/2011 | Horiuchi et al. | 455/550.1 |
| 7,970,344 | B2 * | 6/2011 | Horiuchi et al. | 455/11.1 |
| 2005/0276249 | A1 | 12/2005 | Damnjanovic et al. | |

FOREIGN PATENT DOCUMENTS

| KR | 10-2004-0098777 | 11/2004 |
|---|---|---|
| KR | 10-2005-0082037 | 8/2005 |

* cited by examiner

*Primary Examiner* — Esaw Abraham

(74) *Attorney, Agent, or Firm* — NSIP Law

(57) ABSTRACT

A method and apparatus for handling data error in a data transmission system including a relay station which receives a data from a transmission apparatus and transmits the data to a receiving apparatus is provided. A relay station which transmits, to a receiving apparatus, a data received from a transmission apparatus, the relay station including: a data receiver to receive the data from the transmission apparatus; an error detector to detect whether an error of the received data is generated; and a data transmitter to transmit the received data and an error generation indicator for the received data to the receiving apparatus when the error is generated. According to the present invention, it is possible to combine transmitted data with retransmitted data and decode error-free data by transmitting data including a generated error to a receiving apparatus when error is again generated in the retransmitted data.

22 Claims, 10 Drawing Sheets

FIG. 4A

| COMPONENT | LENGTH | |
|---|---|---|
| EXTENDED SUBHEADER GROUP LENGTH | 8 BIT | ～411 |
| RESERVED | 1 BIT | ～412 |
| EXTENDED SUBHEADER TYPE | 7 BIT | ～413 |
| EXTENDED SUBHEADER BODY | VARIABLE | ～414 |

FIG. 4B

| EXTENDED SUBHEADER TYPE | EXTENDED SUBHEADER NAME | EXTENDED SUBHEADER LENGTH | |
|---|---|---|---|
| 0 | SDU_SN EXTENDED SUBHEADER | 1 BYTE | ~421 |
| 1 | DOWNLINK SLEEP CONTROL EXTENDED SUBHEADER | 3 BYTE | ~422 |
| 2 | FEEDBACK REQUEST EXTENDED SUBHEADER | 3 BYTE | ~423 |
| 3 | SN REQUEST EXTENDED SUBHEADER | 1 BYTE | ~424 |
| 4 | PDU SN(SHORT) EXTENDED SUBHEADER | 1 BYTE | ~425 |
| 5 | PDU SN(LONG) EXTENDED SUBHEADER | 2 BYTE | ~426 |
| 6~127 | RESERVED | RESERVED | ~427 |

FIG. 4C

| EXTENDED SUBHEADER TYPE | EXTENDED SUBHEADER NAME | EXTENDED SUBHEADER LENGTH | |
|---|---|---|---|
| 0 | MIMO MODE FEEDBACK EXTENDED SUBHEADER | 1 BYTE | ~431 |
| 1 | UPLINK TRANSMISSION POWER REPORT EXTENDED SUBHEADER | 1 BYTE | ~432 |
| 2 | SMALL FEEDBACK EXTENDED SUBHEADER | 2 BYTE | ~433 |
| 3 | PDU SN(SHORT) EXTENDED SUBHEADER | 1 BYTE | ~434 |
| 4 | PDU SN(LONG) EXTENDED SUBHEADER | 2 BYTE | ~435 |
| 5~127 | RESERVED | RESERVED | ~436 |

APPARATUS AND METHOD FOR HANDLING DATA ERROR IN DATA TRANSMISSION SYSTEM INCLUDING RELAY STATION

CROSS-REFERENCE TO RELATED APPLICATIONS

This application claims the benefit of U.S. Provisional Application No. 60/909,782, filed on Apr. 3, 2007 in the U.S. Patent and Trademark Office, and Korean Patent Application No. 2007-96151, filed on Sep. 20, 2007 in the Korean Intellectual Property Office, the disclosure of both of which are incorporated herein by reference.

BACKGROUND OF THE INVENTION

1. Field of the Invention

Aspects of the present invention relate to a method and apparatus for handling a data error in a data transmission system including a relay station which receives data from a transmission apparatus and transmits the data to a receiving apparatus, and more particularly, to a method and apparatus for generating an error generation indicator for data including a generated error and transmitting the error generation indicator to a receiving apparatus when an error is generated in data received from a transmission apparatus.

2. Description of the Related Art

Since wireless communication technology has been developed, a wireless network, which can conventionally transmit only a voice signal, has become so developed that the wireless network may transmit data.

When the voice signal is transmitted, only some noise is generated in the voice signal even though an error is generated in a portion of the transmitted voice signal. When two calling persons can recognize each other's voices even though the noise is generated in the voice signal, the voice signal can be continuously transmitted.

Conversely, when the data is transmitted, even though an error is generated in only one bit of a data frame of a predetermined length when transmitting the data, all of the data included in the entire data frame cannot be used. As wireless data transmission increases, a technology of handling the error generated when transmitting the data has been increasingly regarded as important.

A technology of handling the error generated when transmitting the data can be generally classified into two schemes, that is, an Automatic Repeat Request (ARQ) and a Forward Error Correction (FEC).

A Hybrid ARQ (HARQ) is a technology of combining the ARQ with the FEC and handling the error. The HARQ detects an error generated in data using the FEC. When the error is generated in the data, the HARQ requests a transmission apparatus to retransmit the data including a generated error, combines the originally-transmitted data including a generated error with the retransmitted data in response to a retransmission request, and decodes error-free data.

The conventional HARQ is useful for directly transmitting the data from the transmission apparatus to a receiving apparatus. However, the HARQ is required to be respectively used between the transmission apparatus and a relay station, and between the relay station and the receiving apparatus in order to apply the HARQ to a system for transmitting the data from the transmission apparatus to the receiving apparatus via the relay station. Accordingly, when a number of relay stations increases, the system becomes complex, and a transmission efficiency decreases.

Accordingly, a method and apparatus for handling data error in a data transmission system including a relay station is needed.

SUMMARY OF THE INVENTION

Aspects of the present invention provide a method and apparatus for handling data error in a data transmission system including a relay station which can combine transmitted data with retransmitted data and decode error-free data by transmitting data including a generated error to a receiving apparatus when an error is again generated in the retransmitted data.

The present invention also provides a method and apparatus for handling a data error in a data transmission system including a relay station which enables a receiving apparatus having an error correction performance more effective than in a relay station to correct the generated error, and to receive error-free data by transmitting data including a generated error to the receiving apparatus when the error is generated in the data received by the relay station.

According to an aspect of the present invention, there is provided a relay station which transmits, to a receiving apparatus, a data received from a transmission apparatus, the relay station including: a data receiver to receive the data from the transmission apparatus; an error detector to detect whether an error of the received data is generated; and a data transmitter to transmit the received data and an error generation indicator for the received data to the receiving apparatus when the error is generated.

According to another aspect of the present invention, there is provided a data transmission system including: a relay station to receive data from a transmission apparatus, and transmit the received data and an error generation indicator for the received data to a receiving apparatus; and the receiving apparatus to receive the data from the relay station based on the received error generation indicator.

According to still another aspect of the present invention, there is provided a computer-readable recording medium recording a data frame, the data frame including: an error generation indicator to indicate whether an error of specific data is generated, wherein the error of the specific data is generated in a communication link between a transmission apparatus and a relay station, and the specific data is transmitted from the relay station to a receiving apparatus.

According to yet another aspect of the present invention, there is provided a data transmission method which transmits data from a transmission apparatus via a relay station to a receiving apparatus, the method including: receiving the data from a transmission apparatus; detecting whether an error of the received data is generated; generating an error generation indicator for the received data when the error is generated; and transmitting the received data and the generated error generation indicator to the receiving apparatus.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 4A through 4C are diagrams illustrating storing an error generation indicator in an extended subheader defined in an Institute of Electrical and Electronics Engineers (IEEE) 802.16 standard according to an embodiment of the present invention;

DETAILED DESCRIPTION OF EMBODIMENTS

Figure 1:
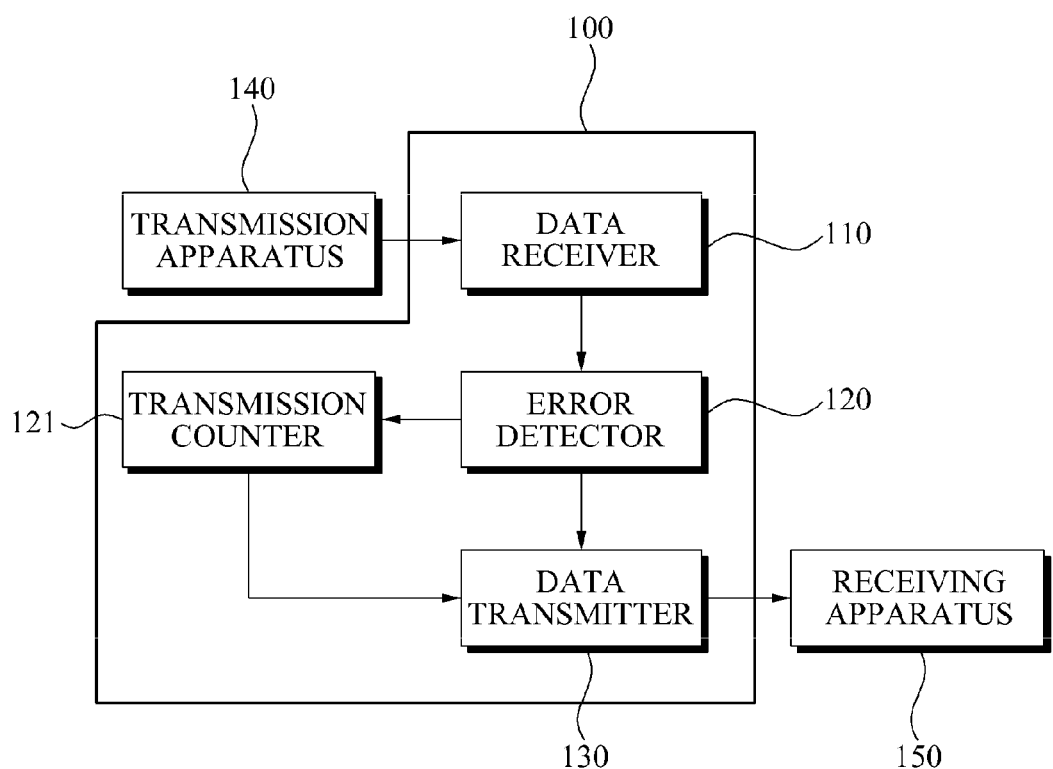
FIG. 1 is a block diagram illustrating a structure of a relay station which adds an error generation indicator and transmits data including a generated error to a receiving apparatus when the error is generated in the data received from a transmission apparatus, according to an embodiment of the present invention.

Reference will now be made in detail to present embodiments of the present invention, examples of which are illustrated in the accompanying drawings, wherein like reference numerals refer to the like elements throughout. The exemplary embodiments are described below in order to explain the present invention by referring to the figures.

FIG. 1 is a block diagram illustrating a structure of a relay station 100 which adds an error generation indicator and transmits data including a generated error to a receiving apparatus 150 when the error is generated in the data received from a transmission apparatus 140, according to an embodiment of the present invention. Hereinafter, a process during which the relay station 100 according to the present invention transmits the data including the generated error to the receiving apparatus 150 is described in detail with reference to FIG. 1. The relay station 100 according to the present invention includes a data receiver 110, an error detector 120, and a data transmitter 130.

The data receiver 110 receives the data from the transmission apparatus 140. An error can be generated when transmitting the data received from the transmission apparatus 140 via a communication link between the transmission apparatus 140 and the relay station 100. According to the present embodiment of the present invention, the transmission apparatus 140 can add error correction information and transmit the data in order to detect whether the error of the data is generated.

The error detector 120 detects whether the error in the data received by the data receiver 110 is generated. The error detector 120 according to the present embodiment of the present invention can detect whether the error of the received data is generated based on the error correction information added to the data.

The data transmitter 130 transmits the received data to the receiving apparatus 150. When the error for the received data is not generated, the data transmitter 130 can simply transmit the data to the receiving apparatus 150. When the error detector 120 detects the error generated in the received data, the data including a generated error and the error generation indicator indicating that the error is generated in the received data may be transmitted to the receiving apparatus 150.

According to the present embodiment of the present invention, the receiving apparatus 150 can perform a more powerful error correction function than the relay station 100. The receiving apparatus 150 may also correct the error which cannot be corrected by the relay station 100, and the relay station 100 may only detect whether the error is generated.

According to the present embodiment of the present invention, when the error is generated in the data received from the transmission apparatus 140 by the relay station 100, the relay station 100 can request the transmission apparatus 140 to retransmit the data. The relay station 100 transmits an error generation message denoting that the error is generated in the received data, and the transmission apparatus 140 retransmits the data to the relay station 100 in response to the error generation message.

When the data is retransmitted from the transmission apparatus 140, the error detector 120 detects whether an error of the retransmitted data is again generated. When the error of the retransmitted data is not generated, the data transmitter 130 transmits the retransmitted data to the receiving apparatus 150. The receiving apparatus 150 receives error-free data from the relay station 100.

When the error of the retransmitted data is generated, the data transmitter 130 transmits the retransmitted data and the error generation indicator for the retransmitted data to the receiving apparatus 150. The receiving apparatus 150 receives the retransmitted data and the error generation indicator for the retransmitted data from the relay station 100. When portions in which each error is generated in the transmitted data are different, the receiving apparatus 150 can combine the transmitted data with the retransmitted data, and decode the error-free data even though an error is generated in both the transmitted data and the retransmitted data.

A data transmission system according to the present embodiment of the present invention can limit a number of retransmissions for the data including the generated error. The number of retransmissions in the present specification denotes a number of transmissions for the data including the generated error via the relay station 100. Specifically, when the number of retransmissions for the data including the generated error is limited, the number of transmissions of the data including the generated error to another relay station 100 or the receiving apparatus 150 by sequentially passing through a plurality of relay stations 100 is limited.

The relay station 100 according to the present embodiment of the present invention can further include a transmission counter 121 to update and store a parameter of the number of retransmissions for the data including the generated error.

The data transmitter 130 transmits the received data to the receiving apparatus when the updated parameter of the number of retransmissions is less than a predetermined retransmission threshold.

According to the present embodiment of the present invention, when the error detector 120 detects the error generated in the data, the transmission counter 121 can increase, by one, the parameter of the number of retransmissions for the data including the generated error, and the data transmitter 130 can compare the updated parameter of the number of retransmissions with the predetermined retransmission threshold, and transmit the data including the generated error to the receiving apparatus 150 when the updated parameter of the number of retransmissions is less than the predetermined retransmission threshold.

According to the present embodiment of the present invention, the data transmitter 130 does not transmit the data and the error generation indicator to the receiving apparatus 150 when the updated parameter of the number of retransmissions is greater than or equal to the predetermined retransmission threshold.

According to the present embodiment of the present invention, the transmission apparatus 140 directly transmits the data to the receiving apparatus 150. The data receiver 110 receives the data transmitted from the transmission apparatus 140 to the receiving apparatus 150. The data received by the data receiver 110 and the data received by the receiving apparatus 150 are identical data, however, the data is classified into the data received by the data receiver 110, that is, a first data, and the data received by the receiving apparatus 150, that is, a second data, in the present specification.

The receiving apparatus 150 detects the error generated in the received second data, and the error detector 120 detects the error generated in the received first data based on the error correction information added to the received first data.

When the error is generated in the second data transmitted from the transmission apparatus 140 to the receiving apparatus 150, the receiving apparatus 150 transmits the error generation message to the transmission apparatus 140. The data receiver 110 receives the error generation message transmitted from the receiving apparatus 150 to the transmission apparatus 140. The data transmitter 130 transmits the first data to the receiving apparatus 150 in response to the error generation message received from the receiving apparatus 150.

The receiving apparatus 150 can combine the second data including the generated error with the first data including a generated error received from the relay station 100, and decode error-free data. Alternatively, the receiving apparatus 150 can correct the error of the second data which cannot be corrected by the relay station 100, using the error correction performance being more effective than the relay station 100.

Figure 2:
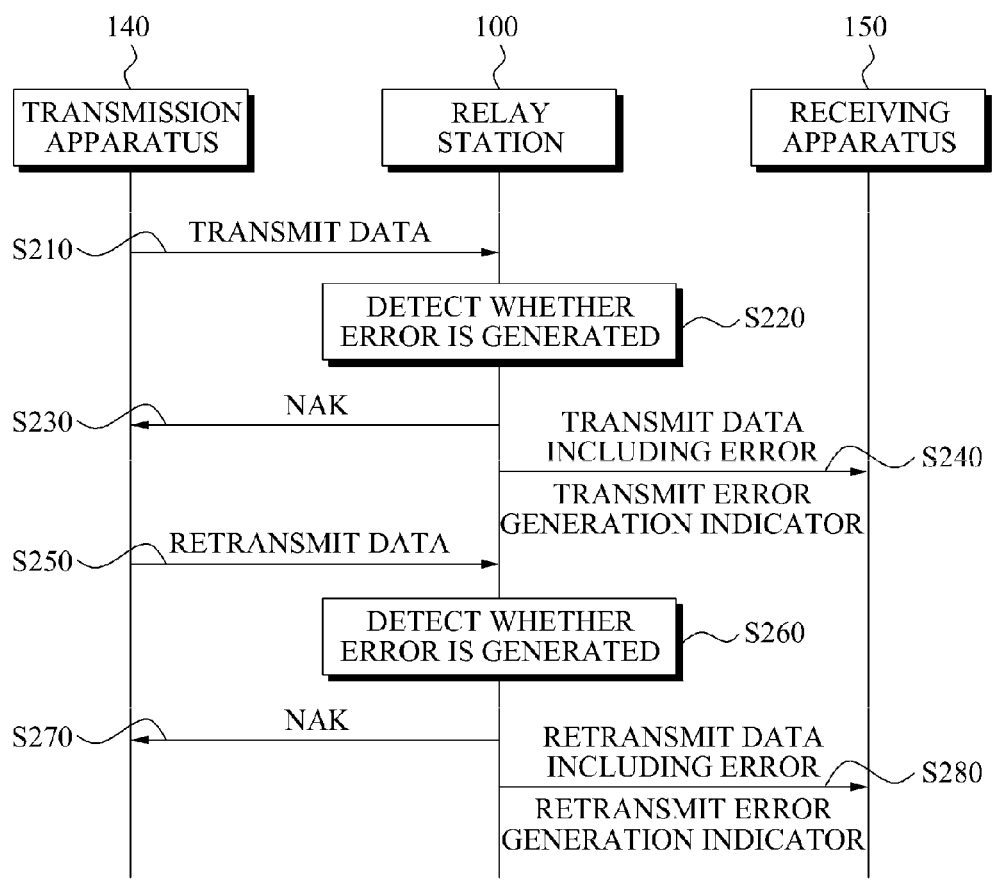
FIG. 2 is a flowchart illustrating a method by which a relay station adds an error generation indicator, and transmits data including a generated error to a receiving apparatus, thereby improving a performance of a transmission system when the error is detected in the data received from a transmission apparatus, according to an embodiment of the present invention.

FIG. 2 is a flowchart illustrating a method by which a relay station transmits data including the generated error and an error generation indicator for the data including the generated error to a receiving apparatus, thereby improving a performance of a transmission system when an error is detected in data received from a transmission apparatus, according to an embodiment of the present invention. Hereinafter, a process during which the relay station according to the present invention transmits the data including the generated error to the receiving apparatus is described in detail with reference to FIG. 2.

In operation S210, the relay station 100 receives the data from the transmission apparatus 140. The received data can include an error generated due to a state of a communication link from the transmission apparatus 140 to the relay station 100. Since there are many cases where the error is generated in the data transmitted via the communication link, error correction information can be added to the data and be transmitted in order to detect the error generated in the received data.

In operation S220, whether the error of the received data is generated is detected. According to the present embodiment of the present invention, the relay station 100 can detect the error generated in the received data based on the added error correction information.

In operation S230, when the error is generated in the received data, the relay station 100 can transmit, to the transmission apparatus 140, an error generation message denoting that the error is generated in the received data, that is, a negative acknowledgement (NAK).

In operation S240, the relay station 100 transmits the received data to the receiving apparatus 150. When the error is not generated in the received data, the data alone may be transmitted to the receiving apparatus 150. When the received data includes generated error, an error generation indicator for the received data is generated. In this case, the relay station 100 can transmit both the data including the generated error and the error generation indicator for the data including the generated error to the receiving apparatus 150.

When the error is generated in the communication link from the transmission apparatus 140 to the relay station 100, the data received by the relay station 100 is the data in which the error is already generated before being received by the relay station 100. The error correction information added by the transmission apparatus 140 is error correction information corresponding to the data before the error is generated. The relay station 100 can detect whether the error is generated in the transmitted data based on the error correction information corresponding to the data before the error is generated. When the error is generated in the data received from the transmission apparatus 140, the error correction information generated by the relay station 100 is error correction information corresponding to the data in which the error is already generated. When the receiving apparatus 150 receives the error correction information from the relay station 100, the receiving apparatus 150 cannot detect the error generated in the received data based on the error correction information corresponding to the data in which the error is already generated before being received by the relay station 100. Accordingly, when the error generation indicator, indicating that the data received by the receiving apparatus 150 includes already generated error, is transmitted to the receiving apparatus 150, the receiving apparatus 150 can detect that the error is generated in the data.

The receiving apparatus 150 can detect the error generated in the data transmitted from the relay station 100 based on the error generation indicator transmitted by the relay station 100.

In operation S250, the transmission apparatus 140 retransmits the data to the relay station 100. According to the present embodiment of the present invention, the relay station 100 can transmit the error generation message to the transmission apparatus 140, and the transmission apparatus 140 can transmit the data in response to the error generation message.

In operation S260, the relay station 100 detects whether the error for the retransmitted data is generated. According to the present embodiment of the present invention, the relay station 100 can detect the error generated in the retransmitted data based on the error correction information added to the retransmitted data.

In operation S270, when the error is generated in the retransmitted data, the relay station 100 can transmit, to the transmission apparatus 140, the error generation message denoting that the error is generated in the retransmitted data, that is, the NAK.

In operation S280, the relay station 100 transmits the retransmitted data to the receiving apparatus 150. When the error is not generated in the retransmitted data, the data can be simply transmitted to the receiving apparatus 150. When the error is generated in the retransmitted data, the relay station 100 generates the error generation indicator for the retransmitted data. The relay station 100 transmits, to the receiving apparatus 150, the retransmitted data and the error generation indicator that the error is generated in the retransmitted data.

According to the present embodiment of the present invention, the receiving apparatus 150 can perform an error correction function more effective than the relay station 100. The receiving apparatus 150 can also correct the error which cannot be corrected by the relay station 100 and only whether the error is generated can be detected by the relay station 100.

According to the present embodiment of the present invention, a method by which at least one of the relay station 100 and the receiving apparatus 150 corrects the error of the data, that is, a method of sequentially repeating a calculation and correcting the error generated in the data, can be used. When the calculation for the received data is repeated, a probability of correcting the error generated in the data increases proportionally to the calculation, in the method of correcting the error. Since a number of calculations for the received data is limited, the probability of correcting the error generated in the received data is low in the relay station 100. However, the number of calculations for the received data can be unlimited in the receiving apparatus 150. Accordingly, the receiving apparatus 150 can correct the error which cannot be corrected by the relay station 100.

According to the present embodiment of the present invention, a turbo code can be used as the method of sequentially repeating the calculation and correcting the error generated in the data. The transmission apparatus 140 can encode the data using the turbo code, and the relay station 100 can decode the data encoded using the turbo code. The relay station 100 transmits the received data to the receiving apparatus 150 when the error generated in the received data is detected. The receiving apparatus 150 can calculate the data encoded using the turbo code without a threshold, and decode the data. Accordingly, the receiving apparatus 150 can correct the error which cannot be corrected by the relay station 100.

Also, in operation S250, when the error is also generated in the data retransmitted from the transmission apparatus 140 to the relay station 100, the relay station 100 can transmit the retransmitted data to the receiving apparatus 150.

When the transmission apparatus 140 and the receiving apparatus 150 are directly connected, not passing through the relay station 100, the receiving apparatus 150 can detect the error generated in the received data, and transmit the error generation message for the data to the transmission apparatus 140. The transmission apparatus 140 can retransmit the transmitted data in response to the error generation message transmitted by the receiving apparatus 150.

The receiving apparatus 150 detects the error in the retransmitted data. When the error is also detected in the retransmitted data, the receiving apparatus 150 can combine the transmitted data with the retransmitted data, and correct the error generated when transmitting the data. The error generated in the data transmitted from the transmission apparatus 140 to the receiving apparatus 150, and the error generated in the retransmitted data are independent from each other. Accordingly, locations of the errors generated in the transmitted data and the retransmitted data are generally different. When the locations of the errors generated in the transmitted data and the retransmitted data are different, the error can be corrected when the two data are combined.

In the data transmission system for transmitting the data via the relay station 100, when the data in which the error is generated during a transmission process from the transmission apparatus 140 to the relay station 100 is not transmitted to the receiving apparatus 150, the receiving apparatus 150 cannot correct the error by combining the two data in which the error is generated.

When the data in which the error is generated during the transmission process from the transmission apparatus 140 to the relay station 100 is transmitted to the receiving apparatus 150, the receiving apparatus 150 can correct the error by performing the strong error correction function, or correct the error by combining the data including a generated error with the retransmitted data. Accordingly, a performance of the data transmission system is improved.

Also, since the receiving apparatus 150 can be unaware of whether the error is generated in the received data when the error correction information generated based on the data including a generated error is transmitted with the data including a generated error, the error generation indicator indicating that the error is generated in the data is transmitted with the data including a generated error to the receiving apparatus 150.

Figure 3:
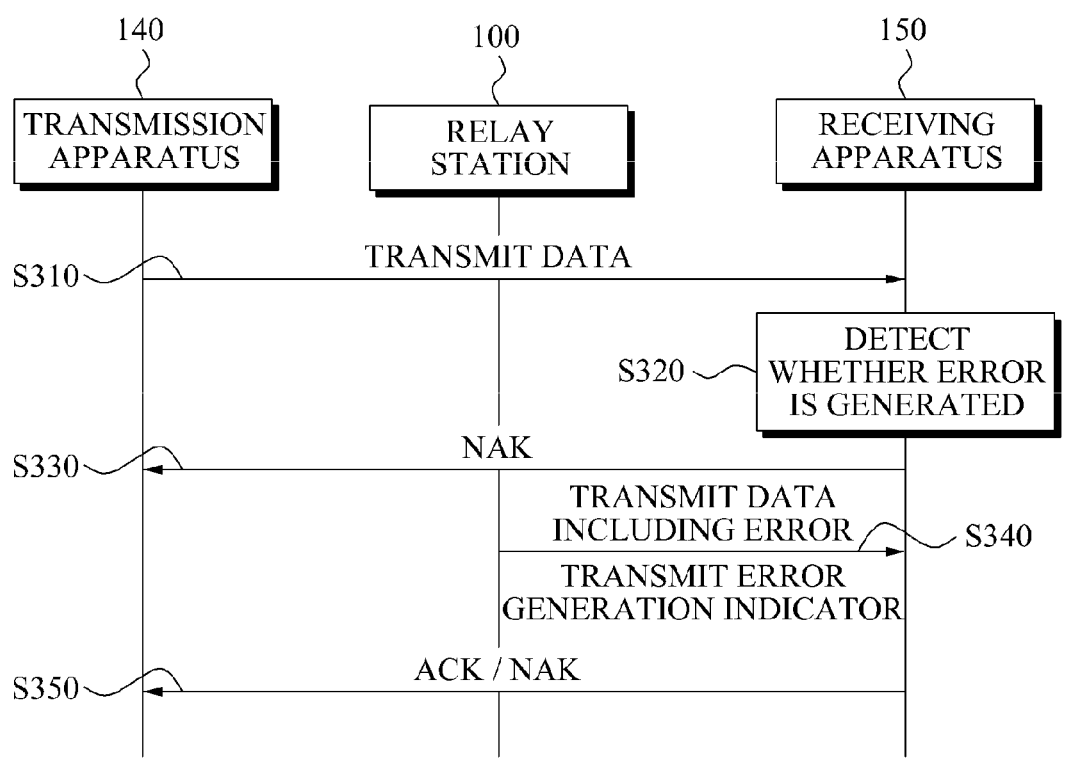
FIG. 3 is a flowchart illustrating a method by which a transparent relay station transmits data including a generated error to a receiving apparatus again in response to an error generation message of the receiving apparatus, according to an embodiment of the present invention.

FIG. 3 is a flowchart illustrating a method by which a transparent relay station transmits data including a generated error to a receiving apparatus again in response to an error generation message of the receiving apparatus, according to an embodiment of the present invention. Hereinafter, a process during which the transparent relay station according to the present invention transmits the data including a generated error to the receiving apparatus is described in detail with reference to FIG. 3.

In operation S310, the transmission apparatus 140 transmits the data directly to the receiving apparatus 150. The relay station 100 receives the data transmitted from the transmission apparatus 140 to the receiving apparatus 150. The data received by the relay station 100 and the data received by the receiving apparatus 150 are the same data, however, the data is classified into the data received by the relay station 100, that is, a first data, and the data received by the receiving apparatus 150, that is, a second data, in the present specification.

In operation S320, the receiving apparatus 150 detects an error generated in the second data received in operation S310. According to the present embodiment of the present invention, the receiving apparatus 150 can detect the error generated in the transmitted second data based on error correction information added to the transmitted second data. The relay station 100 detects the error generated in the received first data based on the error correction information added to the received first data.

When the error is generated in the second data transmitted from the transmission apparatus 140 to the receiving apparatus 150 in operation S320, the receiving apparatus 150 transmits an error generation message to the transmission apparatus 140 in operation S330. The relay station 100 receives the error generation message transmitted from the receiving apparatus 150 to the transmission apparatus 140.

In operation S340, the relay station 100 transmits the first data received by the relay station 100 to the receiving apparatus 150 in response to the error generation message received from the receiving apparatus 150. The relay station 100 transmits an error generation indicator for the first data to the receiving apparatus 150.

The receiving apparatus 150 can combine the second data including a generated error with the first data received from the relay station 100, and decode the error-free data. Alternatively, the receiving apparatus 150 can correct the error of the second data which cannot be corrected by the relay station 100, using an error correction performance more effective than the relay station 100.

According to the present embodiment of the present invention, when the error is not generated in the data decoded by the receiving apparatus 150 in operation S340, the receiving apparatus 150 can transmit, to the transmission apparatus 140, a data transmission acknowledgment message acknowledging that the data is successfully transmitted, that is, an acknowledgment (ACK) in operation S350.

According to the present embodiment of the present invention, in operation S350, the receiving apparatus 150 can correct the error based on at least one of the first data and an error generation indicator for the first data, and transmit, to the transmission apparatus 140, the data transmission acknowledgment message acknowledging that the data is successfully transmitted, that is, the ACK.

According to the present embodiment of the present invention, in operation S350, the receiving apparatus 150 can transmit, to the transmission apparatus 140, the error generation message denoting that the data transmission fails, that is, the NAK when the error cannot be corrected based on at least one of the second data and the error generation indicator for the second data.

According to the present embodiment of the present invention, the error of the specific data is generated in a communication link between the transmission apparatus 140 and the relay station 100, and the specific data is transmitted from the relay station 100 to the receiving apparatus 150. The data transmitter 130 can transmit, to the receiving apparatus 150, an error generation indication area indicating whether the error of the specific data is generated. The receiving apparatus can be aware of whether the error of the specific data is generated, using information of the error generation indication area indicating whether the error of the specific data is generated.

According to the present embodiment of the present invention, the data transmitter 130 can transmit, to the receiving apparatus 150, a parameter of a number of retransmissions indicating the number of retransmissions of the specific data including a generated error via a plurality of relay stations. The parameter of the number of retransmissions can be updated in each relay station through which the specific data including a generated error passes.

FIGS. 4A through 4C are diagrams illustrating storing an error generation indicator in an extended subheader defined in an Institute of Electrical and Electronics Engineers (IEEE) 802.16 standard according to an embodiment of the present invention. Hereinafter, the present embodiment of the present invention storing the error generation indicator in the extended subheader defined in the IEEE 802.16 standard is described in detail with reference to FIGS. 4A through 4C.

FIG. 4A is a diagram illustrating a length of each component of the extended subheader defined in the IEEE 802.16 standard. A first 8-bit area 411 of the extended subheader denotes an extended subheader group length, and a subsequent 1-bit area 412 is reserved. A following 7-bit area 413 denotes an extended subheader type, and an area 414 denoting extended subheader body storing actual contents of the extended subheader is subsequently added. The length of the actual contents of the extended subheader is variable.

FIG. 4B is a diagram illustrating an extended subheader type of a downlink defined in the IEEE 802.16 standard.

When the extended subheader type is 0, an extended subheader name is 'SDU_SN extended subheader', and an extended subheader length is a 1 byte area 421.

When the extended subheader type is 1, the extended subheader name is 'Downlink (DL) sleep control extended subheader', and the extended subheader length is a 3 byte area 422.

When the extended subheader type is 2, the extended subheader name is 'Feedback request extended subheader', and the extended subheader length is a 3 byte area 423.

When the extended subheader type is 3, the extended subheader name is 'SN request extended subheader', and the extended subheader length is a 1 byte area 424.

When the extended subheader type is 4, the extended subheader name is 'PDU SN(short) extended subheader', and the extended subheader length is a 1 byte area 425.

When the extended subheader type is 5, the extended subheader name is 'PDU SN(long) extended subheader', and the extended subheader length is a 2 byte area 426.

When the extended subheader types are 6 to 127, the extended subheader name is reserved and the extended subheader length is a reserved area 427.

As described above, since the extended subheader type of the downlink is reserved when the extended subheader types are 6 to 127, at least one of the extended subheader types of the downlink, that is, 6 to 127, can be used for transmitting the error generation indicator for the data including a generated error.

According to the present embodiment of the present invention, when the error is detected in the data transmitted by the transmission apparatus 140, the data transmitter 130 can store, in the extended subheader type, the error generation indicator for the data in which the error is detected, and transmit the error generation indicator to the receiving apparatus 150.

According to the present embodiment of the present invention, the data transmitter 130 can store, in the extended subheader type, the parameter of the number of retransmissions indicating the number of retransmitting the data including a generated error from the specific relay station 100 to at least one of another relay station and the receiving apparatus 150, and transmit the parameter of the number of retransmissions to the receiving apparatus 150.

According to a data transmission method of the present embodiment of the present invention, when the error is detected in the data transmitted by the transmission apparatus 140, the error generation indicator for the data in which the error is detected can be stored in the extended subheader type, and be transmitted to the receiving apparatus 150 in operation S240 and operation S280 described above with reference to FIG. 2.

According to the data transmission method of the present embodiment of the present invention, the number of retransmitting the data including a generated error from the specific relay station 100 to at least one of another relay station and the receiving apparatus 150 can be transmitted to the receiving apparatus 150 in operation S240 and operation S280 described above with reference to FIG. 2. According to the data transmission method of the present embodiment of the present invention, the parameter of the number of retransmissions indicating the number of retransmitting the data including a generated error from the specific relay station 100 to at least one of the other relay station and the receiving apparatus 150 can be stored in the extended subheader type, and be transmitted to the receiving apparatus 150 in operation S240 and operation S280 described above with reference to FIG. 2.

FIG. 4C is a diagram illustrating an extended subheader type of an uplink defined in the IEEE 802.16 standard.

When the extended subheader type is 0, an extended subheader name is 'Multi Input Multi Output (MIMO) mode feedback extended subheader', and an extended subheader length is a 1 byte area 431.

When the extended subheader type is 1, the extended subheader name is 'Uplink (UL) transmission power report extended subheader', and the extended subheader length is a 1 byte area 432.

When the extended subheader type is 2, the extended subheader name is 'Small feedback extended subheader', and the extended subheader length is a 2 byte area 433.

When the extended subheader type is 3, the extended subheader name is 'PDU SN (short) extended subheader', and the extended subheader length is a 1 byte area 434.

When the extended subheader type is 4, the extended subheader name is 'PDU SN(long) extended subheader', and the extended subheader length is a 2 byte area 435.

When the extended subheader types are 5 to 127, the extended subheader name is reserved and the extended subheader length is a reserved area 436.

As described above, since the extended subheader type of the uplink is reserved when the extended subheader types are 5 to 127, at least one of the extended subheader types of the uplink, that is, 5 to 127, can be used for transmitting the error generation indicator for the data including a generated error.

According to the present embodiment of the present invention, when the error is detected in the data transmitted by the transmission apparatus 140, the data transmitter 130 of the relay station 100 can store, in the extended subheader type, the error generation indicator for the data in which the error is detected, and transmit the error generation indicator to the receiving apparatus 150.

According to a data transmission method of the present embodiment of the present invention, when the error is detected in the data transmitted by the transmission apparatus 140, the error generation indicator for the data in which the error is detected can be stored in the extended subheader type, and be transmitted to the receiving apparatus 150 in operation S240 and operation S280 described above with reference to FIG. 2.

Figure 5:
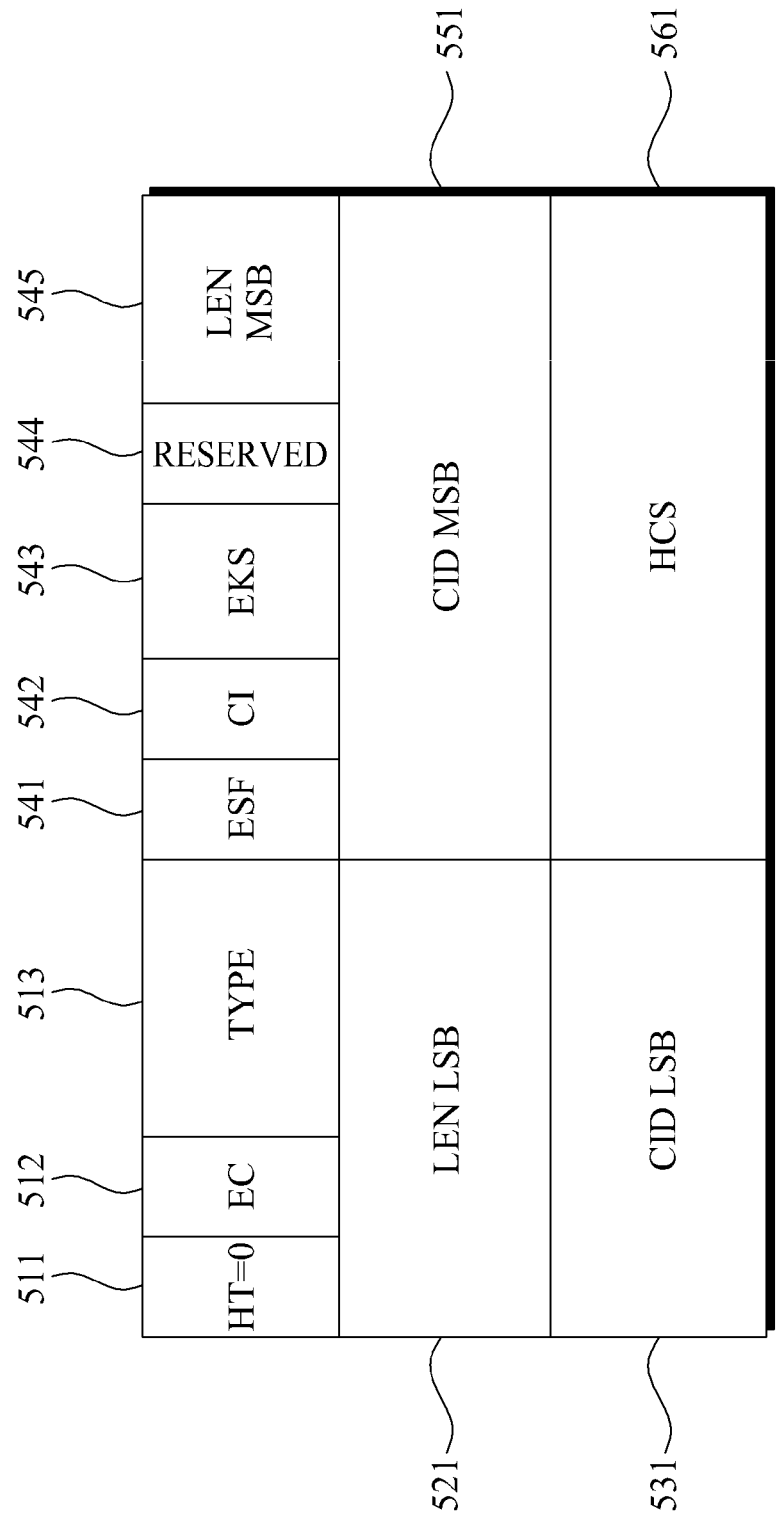
FIG. 5 is a diagram illustrating storing an error generation indicator in a Generic Media Access Control (MAC) Header (GMH) defined in an IEEE 802.16 standard according to an embodiment of the present invention.

FIG. 5 is a diagram illustrating storing an error generation indicator in a Generic Media Access Control (MAC) Header (GMH) defined in an IEEE 802.16 standard according to an embodiment of the present invention. Hereinafter, the present embodiment of the present invention transmitting the GMH defined in the IEEE 802.16 standard, the GMH including the error generation indicator, is described in detail with reference to FIG. 5.

The GMH defined in the IEEE 802.16 standard includes information such as HT 511, EC 512, and type 513, and includes LEN most significant bit (MSB) 545, LEN least significant bit (LSB) 521, CID MSB 551, CID LSB 531, and HCS 561.

Also, the GMH includes information of ESF 541, CI 542, and EKS 543. A reserved bit 544 in which indeterminate information is transmitted exists in the GMH.

According to the present embodiment of the present invention, when the error is detected in the data transmitted by the transmission apparatus 140, the data transmitter 130 of the relay station 100 can transmit the error generation indicator for the data including a generated error using the reserved bit 544 of the GMH defined in the IEEE 802.16 standard.

According to a data transmission method of the present embodiment of the present invention, when the error is detected in the data transmitted by the transmission apparatus 140, the error generation indicator for the data in which the error is detected can be transmitted to the receiving apparatus 150 using the reserved bit 544 of the GMH defined in the IEEE 802.16 standard in operation S240 and operation S280 described above with reference to FIG. 2.

According to the present embodiment of the present invention, the relay station 100 can further include an error correction information generator to generate error correction information for the received first data by considering whether the error of the received first data is generated.

When the error is generated in the data received from the transmission apparatus 140, the relay station 100 generates the error correction information based on the data in which the error is already generated. Since the error correction information generated by the relay station 100 corresponds to the data in which the error is already generated, the error cannot be detected even though the receiving apparatus 150 receives the error correction information from the relay station 100.

Accordingly, the error correction information generator generates the error correction information different from the data in which the error is already generated by considering the error generated in the data. The receiving apparatus 150 receives the data including a generated error and the error correction information from the relay station 100. Since the data and the error correction information received by the receiving apparatus 150 are different from each other, the receiving apparatus 150 can detect the error generated in the data.

According to the data transmission method of the present embodiment of the present invention, when the error is detected in the data transmitted by the transmission apparatus 140, the relay station 100 can generate the error correction information different from the data including a generated error, and transmit the error correction information to the receiving apparatus 150 in operation S240 and operation S280 described above with reference to FIG. 2.

According to the present embodiment of the present invention, the data transmitter 130 can transmit, to the receiving apparatus 150, the error correction information not corresponding to the data including a generated error as the error generation indicator for the first data.

According to the present embodiment of the present invention, the parameter of the number of retransmissions for the data including a generated error can be stored in the extended subheader of FIGS. 4B and 4C, and the GMH of FIG. 5.

Figure 6:
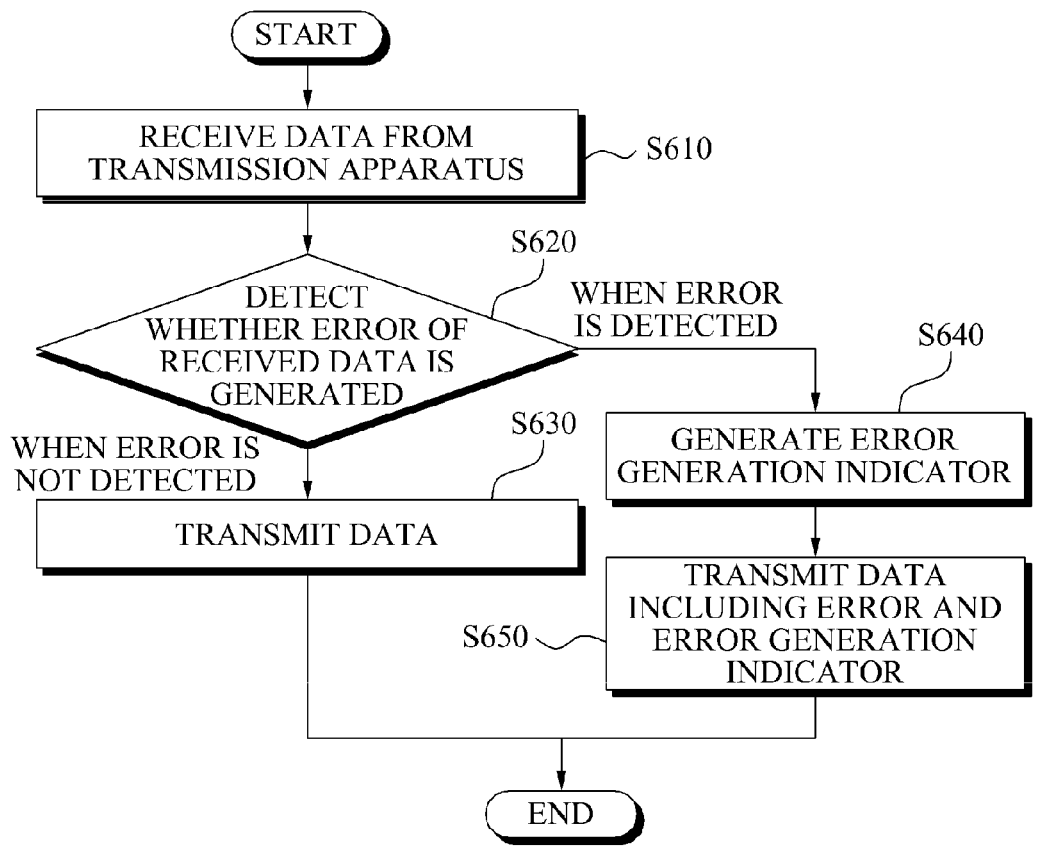
FIG. 6 is a flowchart illustrating a method by which a relay station transmits an error generation indicator and data including a generated error to a receiving apparatus when the error is detected in the data received from a transmission apparatus, according to an embodiment of the present invention.

FIG. 6 is a flowchart illustrating a method by which a relay station transmits an error generation indicator and data including a generated error to a receiving apparatus when an error is generated in a data received from a transmission apparatus according to an embodiment of the present invention. Hereinafter, operations of the relay station according to the present invention are described in detail with reference to FIG. 6.

In operation S610, the relay station 100 receives the data from the transmission apparatus 140. According to the present embodiment of the present invention, the relay station 100 can additionally receive error correction information added to the data.

In operation S620, the relay station 100 detects whether an error of the data received in operation S610 is generated. According to the present embodiment of the present invention, the relay station 100 can detect whether the error of the received data is generated based on the error correction information additionally received in operation S610.

When the error generation of the data cannot be detected in operation S620, the data received in operation S610 is transmitted to the receiving apparatus 150 in operation S630.

When the error generation of the data is detected in operation S620, an error generation indicator for the data received in operation S610 is generated in operation S640.

In operation S650, the data including a generated error and the error generation indicator generated in operation S640 are transmitted to the receiving apparatus 150.

According to the present embodiment of the present invention, the relay station 100 stores the generated error generation indicator in an extended subheader of an IEEE 802.16 standard, and transmits the error generation indicator to the receiving apparatus 150.

According to the present embodiment of the present invention, the relay station 100 transmits, to the receiving apparatus 150, in a reserved bit of a GMH of the IEEE 802.16 standard the error generation indicator for the data received by the relay station.

According to the present embodiment of the present invention, the relay station 100 can generate the error correction information not corresponding to the data including a generated error, and transmit the error correction information as the error generation indicator to the receiving apparatus 150.

Figure 7:
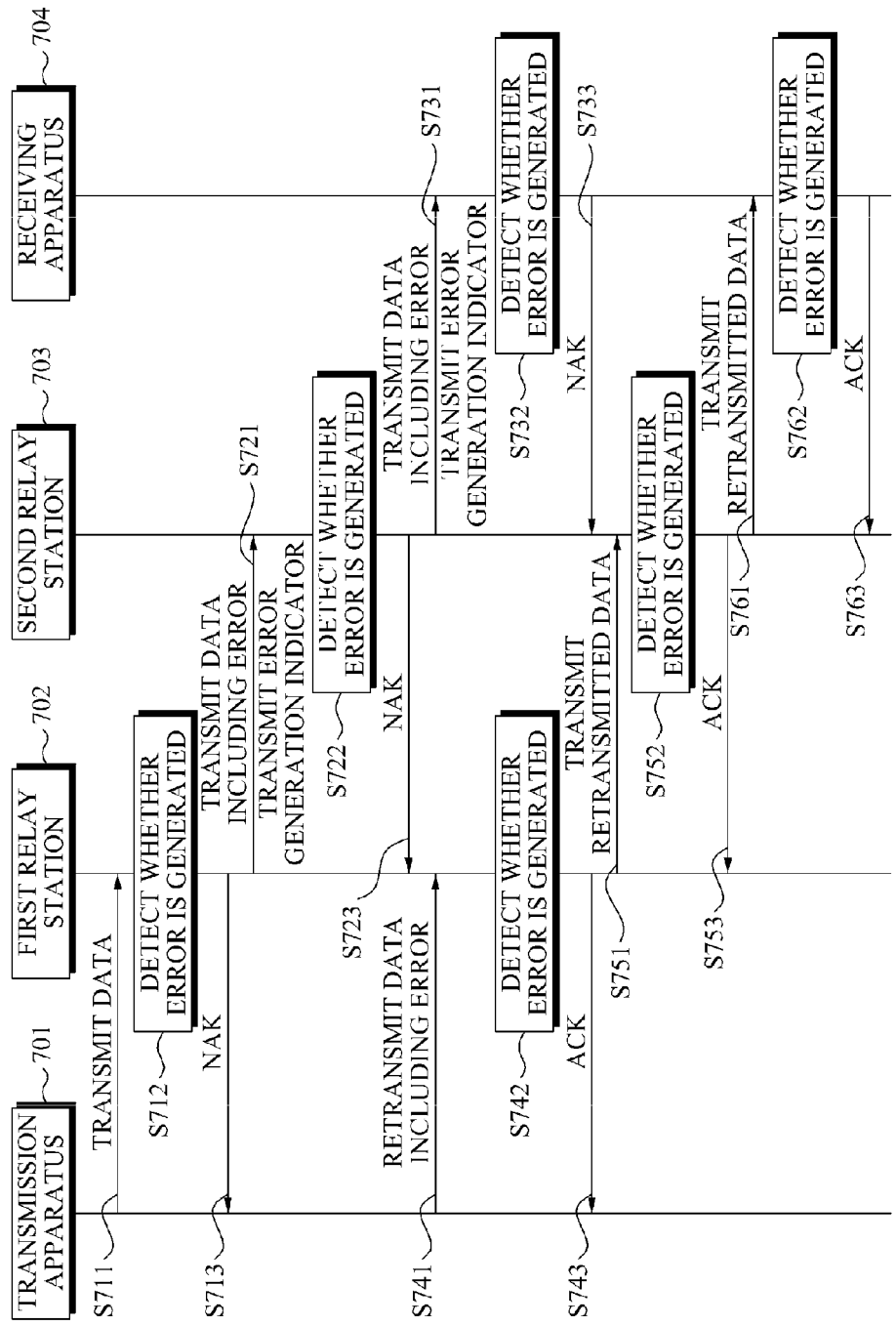
FIG. 7 is a flowchart illustrating a method by which a transmission system transmits data including a generated error and an error generation indicator for the data including the generated error via a plurality of relay stations to a receiving apparatus, according to an embodiment of the present invention.

FIG. 7 is a flowchart illustrating a method by which a transmission system transmits data including a generated error, and an error generation indicator for the data including a generated error, to a receiving apparatus via a plurality of relay stations according to an embodiment of the present invention. Hereinafter, operations of the transmission system according to the present invention are described in detail with reference to FIG. 7.

A transmission apparatus 701 transmits the data to a receiving apparatus 704 sequentially passing through a first relay station 702 and a second relay station 703. Even though FIG. 7 illustrates the present embodiment of the present invention passing through two relay stations, more than two relay stations can be passed through according to another embodiment of the present invention.

In operation S711, the transmission apparatus 701 transmits the data to the first relay station 702. According to the present embodiment of the present invention, the transmission apparatus 701 can add error correction information for the data to the data, and transmit the error correction information to the first relay station 702. Hereinafter, a case where the error is generated in the data transmitted from the transmission apparatus 701 to the first relay station 702 is assumed for convenience of description.

In operation S712, the first relay station 702 detects the error generated in the data received from the transmission apparatus 701. According to the present embodiment of the present invention, the first relay station 702 can detect the error of the received data using error correction information added to the data.

When the error is generated in the received data, the first relay station 702 can transmit an error generation message, that is, a NAK to the transmission apparatus 701 in operation S713.

In operation S721, the first relay station 702 transmits the data including a generated error to the second relay station 703. The first relay station 702 transmits, to the second relay station 703, an error generation indicator indicating that the error is generated in the transmitted data.

In operation S722, the second relay station 703 detects the error generated in the data received from the first relay station 702. According to the present embodiment of the present invention, the second relay station 703 can be aware that the error is generated in the received data based on the error generation indicator received from the first relay station 702.

When the error is detected in operation S722, the second relay station 703 transmits an error generation message for the received data to the first relay station 702 in operation S723.

In operation S731, the second relay station 703 transmits the data to the receiving apparatus 704. The second relay station 703 can transmit the data including a generated error and the error generation indicator for the data to the receiving apparatus 704.

In operation S732, the receiving apparatus 704 detects whether the error is generated in the received data based on the error generation indicator transmitted by the second relay station 703.

In operation S733, the receiving apparatus 704 transmits, to the second relay station 703, the error generation message for the received signal in which the error is generated.

In operation S741, the transmission apparatus 701 retransmits the data including a generated error in response to the error generation message from the first relay station 702.

In operation S742, the first relay station 702 detects whether the error is generated in the retransmitted data. A case where the error is not generated in the data retransmitted from the transmission apparatus 701 to the first relay station 702 is assumed for convenience of description.

In operation S743, the first relay station 702 transmits, to the transmission apparatus 701, a data transmission acknowledgement message for the retransmitted data, that is, an ACK.

In operation S751, the first relay station 702 transmits the retransmitted data to the second relay station 703.

In operation S752, the second relay station 703 detects whether the error is generated in the retransmitted data. According to the present embodiment of the present invention, the first relay station 702 transmits the error correction information to the second relay station 703 in operation S751, and the second relay station 703 detects whether the error is generated in the retransmitted data based on the error correction information received from the first relay station 702 in operation S752.

In operation S753, the second relay station 703 transmits, to the first relay station 702, the data transmission acknowledgement message for the retransmitted data, that is, the ACK.

In operation S761, the second relay station 703 transmits the retransmitted data to the receiving apparatus 704. When the error is generated in the retransmitted data received from the first relay station 702 by the second relay station 703, the second relay station 703 transmits the retransmitted data including a generated error and the error generation indicator for the retransmitted data to the receiving apparatus 704.

In operation S762, the receiving apparatus 704 detects whether the error is generated in the retransmitted data. According to the present embodiment of the present invention, the second relay station 703 transmits the error correction information to the receiving apparatus 704 in operation S761, and the receiving apparatus 704 detects whether the error is generated in the retransmitted data based on the error correction information received from the second relay station 703.

When it is detected that the error is generated in the retransmitted data, the receiving apparatus 704 can combine the transmitted data with the retransmitted data, and decode the error-free data.

In operation S763, the receiving apparatus 704 transmits ACK, or NAK to the second relay station 703.

Figure 8:
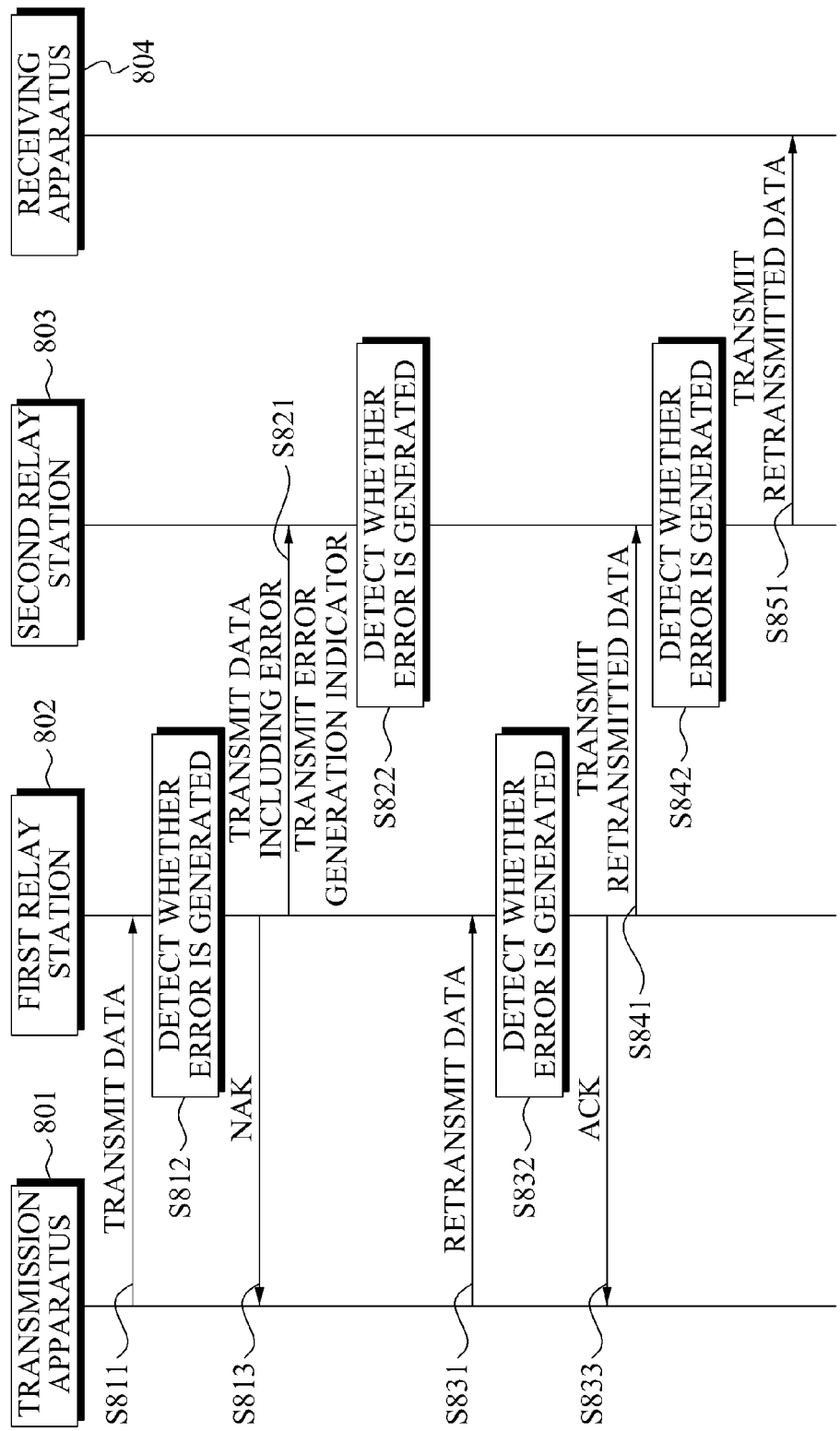
FIG. 8 is a flowchart illustrating an embodiment in which a number of transmissions of data including a generated error and an error generation indicator for the data including the generated error via a relay station is limited in a transmission system, according to the present invention.

FIG. 8 is a flowchart illustrating an embodiment in which a number of transmissions of data including a generated error and an error generation indicator for the data including a generated error via a relay station is limited in a transmission system according to the present invention. Hereinafter, operations of the transmission system according to the present invention are described in detail with reference to FIG. 8.

In operation S811, a transmission apparatus 801 transmits the data to a first relay station 802. According to the present embodiment of the present invention, the transmission apparatus 801 can add error correction information for the data to the data, and transmit the error correction information to the first relay station 802. Hereinafter, a case where the error is generated in the data transmitted from the transmission apparatus 801 to the first relay station 802 is assumed for convenience of description.

In operation S812, the first relay station 802 detects the error generated in the data received from the transmission apparatus 801. According to the present embodiment of the present invention, the first relay station 802 can detect the error of the received data using error correction information added to the data.

When the error is generated in the received data, the first relay station 802 updates a parameter of a number of retransmissions for the data including a generated error. According to the present embodiment of the present invention, the first relay station 802 can increase, by one, the parameter of the number of retransmissions for the data including a generated error when the error is generated in the received data.

The first relay station 802 compares the increased parameter of the number of retransmissions with a predetermined retransmission threshold, and transmits the data including a generated error to a second relay station 803 when the parameter of the number of retransmissions is less than the predetermined retransmission threshold.

When the error is generated in the received data, the first relay station 802 transmits an error generation message to the transmission apparatus 801 in operation S813.

In operation S821, the first relay station 802 transmits the data including a generated error to the second relay station 803. The first relay station 802 transmits an error generation indicator indicating that the error is generated in the transmitted data, and the parameter of the number of retransmissions for the data including a generated error to the second relay station 803.

In operation S822, the second relay station 803 detects the error generated in the data received from the first relay station 802. According to the present embodiment of the present invention, the second relay station 803 can be aware that the error is generated in the received data based on the error generation indicator received from the first relay station 802.

The second relay station 803 updates the parameter of the number of retransmissions for the data including a generated error. According to the present embodiment of the present invention, the second relay station 803 can increase, by one, the parameter of the number of retransmissions for the data including a generated error when the error is generated in the received data.

The second relay station 803 compares the increased parameter of the number of retransmissions with a predetermined retransmission threshold, and transmits the data including a generated error to the receiving apparatus 804 when the parameter of the number of retransmissions is less than the predetermined retransmission threshold.

Even though FIG. 8 illustrates the present embodiment of the present invention in which the retransmission threshold is two, the retransmission threshold can be different from two according to another embodiment of the present invention. The first relay station 802 updates the parameter of the number of retransmissions for the data including a generated error by one in a communication link from the transmission apparatus 801 to the first relay station 802, and the second relay station 803 updates the parameter of the number of retransmissions for the data including a generated error by two. Since the parameter of the number of retransmissions is greater than or equal to the retransmission threshold, the second relay station 803 does not transmit the data including a generated error to the receiving apparatus 804.

According to the present embodiment of the present invention, each relay station 802 and 803 does not transmit the data and the error generation indicator to the receiving apparatus 804 when the updated parameter of the number of retransmissions is greater than or equal to the predetermined retransmission threshold.

In operation S831, the transmission apparatus 801 retransmits the data to the first relay station 802 in response to the error generation message of the first relay station 802.

In operation S832, the first relay station 802 detects whether the error is generated in the retransmitted data.

When the error is not generated in the retransmitted data, the first relay station 802 transmits a data transmission acknowledgement message for the retransmitted data to the transmission apparatus 801 in operation S833.

In operation S841, the first relay station 802 transmits the retransmitted data to the second relay station 803.

In operation S842, the second relay station 803 detects whether the error is generated in the retransmitted data. According to the present embodiment of the present invention, the first relay station 802 transmits the retransmitted data and error correction information for the retransmitted data to the second relay station 803 in operation S841, and the second relay station 803 detects whether the error is generated in the retransmitted data based on the error correction information transmitted by the first relay station 802.

When the error is detected in the retransmitted data, the second relay station 803 updates a parameter of a number of retransmissions for the retransmitted data. According to the present embodiment of the present invention, the second relay station 803 can increase, by one, the parameter of the number of retransmissions for the retransmitted data when the error is generated in the retransmitted data. The parameter of the number of retransmissions for the retransmitted data increases by one.

Since the updated parameter of the number of retransmissions is less than the retransmission threshold of the present embodiment of the present invention, that is, two, the second relay station 803 transmits the retransmitted data to the receiving apparatus 804 in operation S851.

The receiving apparatus 804 can combine the retransmitted data with transmitted data, and decode the error-free data.

According to the present embodiment of the present invention, accumulation of the error generated when the data passes through a plurality of relay stations 802 and 803 can be prevented. When the error is accumulated in the received data, the error-free data cannot be decoded even though the receiving apparatus 804 combines a plurality of data. Accordingly, a number of transmissions of the data including a generated error by the plurality of relay stations 802 and 803 can be limited in order not to waste radio resources.

The data transmission method according to the above-described embodiments of the present invention may be recorded in computer-readable media including program instructions to implement various operations embodied by a computer.

Also, the data frame for transmitting the error generation indicator according to the above-described embodiments of the present invention may be recorded in computer-readable media including program instructions to implement various operations embodied by a computer.

The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention. When all or a portion of operations of a transmission apparatus, receiving apparatus, and relay described in the present invention is embodied in the computer program, computer-readable media storing the computer program are included in the present invention.

Although a few embodiments of the present invention have been shown and described, it would be appreciated by those skilled in the art that changes may be made to these embodiments without departing from the principles and spirit of the invention, the scope of which is defined by the claims and their equivalents.

What is claimed is:

1. A relay station which transmits, to a receiving apparatus, data received from a transmission apparatus, the relay station comprising:
   a data receiver configured to receive the data from the transmission apparatus;
   an error detector configured to detect whether an error of the received data is generated; and
   a data transmitter configured to transmit the received data and an error generation indicator for the received data to the receiving apparatus in response to the error being generated,
   wherein the error generation indicator indicates that the transmitted received data includes an error.

2. The relay station of claim 1, further comprising:
   a transmission counter configured to update and store a parameter of a number of retransmissions for the data in response to the error being generated,
   wherein the data transmitter transmits the received data to the receiving apparatus in response to the updated parameter of the number of retransmissions being less than a predetermined retransmission threshold.

3. The relay station of claim 2, wherein the data transmitter does not transmit the data and the error generation indicator to the receiving apparatus in response to the updated parameter of the number of retransmissions being greater than or equal to the predetermined retransmission threshold.

4. The relay station of claim 1, wherein the transmission apparatus transmits, to the receiving apparatus, second data identical to the data, and
   the data receiver receives, from the receiving apparatus, an error generation message for the second data, and the data transmitter transmits, to the receiving apparatus, the data and the error generation indicator for the data in response to the received error generation message.

5. The relay station of claim 1, wherein the data transmitter stores the error generation indicator in an extended subheader defined in an Institute of Electrical and Electronics Engineers (IEEE) 802.16 standard, and transmits the error generation indicator.

6. The relay station of claim 1, wherein the data transmitter stores the error generation indicator in a Generic Media Access Control (MAC) Header (GMH) defined in an IEEE 802.16 standard, and transmits the error generation indicator.

7. The relay station of claim 1, further comprising:
   an error correction information generator configured to generate error correction information for the received data by considering whether the error of the received data is generated,
   wherein the data transmitter transmits the generated error correction information as the error generation indicator to the receiving apparatus.

8. A data transmission system comprising:
   a relay station configured to receive data from a transmission apparatus, and transmit the received data and an error generation indicator for the received data to a receiving apparatus; and
   the receiving apparatus configured to receive the data from the relay station based on the received error generation indicator,
   wherein the error generation indicator indicates that the transmitted received data includes an error.

9. The system of claim 8, wherein the receiving apparatus receives, from the transmission apparatus, second data identical to the data, and
   the relay station receives an error generation message for the data received from the transmission apparatus by the receiving apparatus, and transmits, to the receiving apparatus, the error generation indicator for the data received by the relay station in response to the received error generation message.

10. A computer-readable recording medium recording a data frame, the data frame comprising:
    an error generation indicator configured to indicate whether an error of specific data is generated,
    wherein the error of the specific data is generated in a communication link between a transmission apparatus and a relay station, and the specific data is transmitted from the relay station to a receiving apparatus.

11. The recording medium of claim 10, further comprising:
    a parameter of a number of retransmissions to indicate the number of retransmissions of the specific data,
    wherein the parameter of the number of retransmissions is updated in each relay station through which the specific data passes.

12. The recording medium of claim 10, wherein the error generation indicator is stored in an extended subheader defined in an IEEE 802.16 standard.

13. The recording medium of claim 10, wherein the error generation indicator is stored in a GMH defined in an IEEE 802.16 standard.

14. A data transmission method which transmits data from a transmission apparatus via a relay station to a receiving apparatus, the method comprising:
    receiving the data from a transmission apparatus;
    detecting whether an error of the received data is generated;
    generating an error generation indicator for the received data in response to the error being generated; and
    transmitting the received data and the generated error generation indicator to the receiving apparatus, wherein the error generation indicator indicates that the transmitted received data includes an error.

15. The method of claim 14, further comprising:
updating a parameter of a number of retransmissions for the received data in response to the error being generated,
wherein the transmitting transmits the received data to the receiving apparatus in response to the updated parameter of the number of retransmissions being less than a predetermined retransmission threshold.

16. The method of claim 15, wherein the transmitting does not transmit the data and the error generation indicator to the receiving apparatus in response to the updated parameter of the number of retransmissions being greater than or equal to the predetermined retransmission threshold.

17. The method of claim 14, further comprising:
receiving an error generation message for second data received from the transmission apparatus by the receiving apparatus,
wherein the receiving of the data receives the data identical to the second data, and
the transmitting transmits the error generation indicator to the receiving apparatus in response to the received error generation message.

18. The method of claim 14, wherein the transmitting stores the error generation indicator in an extended subheader defined in an IEEE 802.16 standard, and transmits the error generation indicator.

19. The method of claim 14, wherein the transmitting transmits the error generation indicator using a predetermined bit of a GMH defined in an IEEE 802.16 standard.

20. The method of claim 14, further comprising:
generating error correction information for the received data by considering the generated error in response to the error being generated,
wherein the transmitting transmits the generated error correction information as the error generation indicator to the receiving apparatus.

21. A computer-readable recording medium storing a program for implementing a data transmission method which transmits data from a transmission apparatus via a relay station to a receiving apparatus, the method comprising:
receiving the data from a transmission apparatus;
detecting whether an error of the received data is generated;
generating an error generation indicator for the received data in response to the error being generated; and
transmitting the received data and the generated error generation indicator to the receiving apparatus,
wherein the error generation indicator indicates that the transmitted received data includes an error.

22. The relay station of claim 1, wherein the received data is separated from the error generation indicator.

\* \* \* \* \*